US012793587B2

(12) United States Patent
Hong et al.

(10) Patent No.: US 12,793,587 B2
(45) Date of Patent: Nov. 10, 2026

(54) LIGHT EMITTING DISPLAY APPARATUS INCLUDING DATA DRIVER AND CONTROL DRIVER

(71) Applicant: LG DISPLAY CO., LTD., Seoul (KR)

(72) Inventors: MooKyoung Hong, Gyeonggi-do (KR); Uitaek Jeong, Gyeonggi-do (KR); HyeonWoo Lee, Gyeonggi-do (KR); DongKyu Yang, Gyeonggi-do (KR); SinKyun Park, Gyeonggi-do (KR); JoonYoung Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 152 days.

(21) Appl. No.: 18/386,271

(22) Filed: Nov. 2, 2023

(65) Prior Publication Data

US 2024/0221555 A1 Jul. 4, 2024

(30) Foreign Application Priority Data

Dec. 30, 2022 (KR) ........................ 10-2022-0190706

(51) Int. Cl.
*G09G 3/00* (2006.01)
*G09G 3/32* (2016.01)

(52) U.S. Cl.
CPC ............... *G09G 3/006* (2013.01); *G09G 3/32* (2013.01); *G09G 2310/0297* (2013.01); *G09G 2310/08* (2013.01)

(58) Field of Classification Search
CPC .. G09G 3/006; G09G 3/32; G09G 2310/0297; G09G 2310/08; G09G 3/3233; G09G 3/3275; G09G 3/3291; G09G 2320/02; G09G 2340/0435
See application file for complete search history.

(56) References Cited

U.S. PATENT DOCUMENTS

2021/0398508 A1 * 12/2021 Lee ........................ G09G 5/363

FOREIGN PATENT DOCUMENTS

KR 2011-0044524 A 4/2011
KR 10-2019-0011974 A 2/2019
KR 2020-0029178 A 3/2020
KR 2020-0057295 A 5/2020
KR 2021-0081959 A 7/2021
KR 10-2021-0158458 A 12/2021

* cited by examiner

*Primary Examiner* — David D Davis
(74) *Attorney, Agent, or Firm* — Fish & Richardson P.C.

(57) ABSTRACT

Aspects of the present disclosure are directed to a light emitting display apparatus includes a control driver configured to (1) delay a second data enable signal to an (n)th data enable signal by a delay period when a frequency of a first data enable signal is greater than a first reference frequency, and (2) convert input image data into image data, wherein n is a natural number greater than or equal to 2; a data driver configured to output data voltages by using the first data enable signal to the (n)th data enable signal and the image data transmitted from the control driver; and a light emitting display panel provided with pixels and data lines to which the data voltages are supplied.

19 Claims, 6 Drawing Sheets

LIGHT EMITTING DISPLAY APPARATUS INCLUDING DATA DRIVER AND CONTROL DRIVER

CROSS-REFERENCE TO RELATED APPLICATIONS

This application claims the benefit of the Korean Patent Application No. 10-2022-0190706 filed on Dec. 30, 2022, which is hereby incorporated by reference in its entirety.

BACKGROUND

Field of the Disclosure

The present disclosure relates to a light emitting display apparatus.

Description of the Background

Light emitting display apparatuses are mounted on electronic products such as televisions, monitors, notebook computers, smart phones, tablet computers, electronic pads, wearable devices, watch phones, portable information devices, navigation devices, or vehicle control display apparatus to display images.

To prevent a performance reduction of a light emitting display apparatus due to degradation of the light emitting device, a threshold voltage of a driving transistor is sensed when the light emitting display apparatus is driven, and an appropriate compensation method is performed accordingly.

Moreover, to clearly express various types of images such as video and still image and reduce the power consumption of a light emitting display apparatus, a light emitting display apparatus using variable frequencies is proposed.

However, in a light emitting display apparatus to which voltage sensing and compensation are applied, the range in which a frequency may be increased is limited due to a sensing period.

SUMMARY

A vertical blank period appropriate for a data enable signal is provided for sensing a driving transistor. However, when the magnitude of the variable frequency exceeds a predetermined range, sensing of the driving transistor cannot be performed smoothly because the vertical blank period of the data enable signal is reduced. Accordingly, the range of the variable frequency of the light emitting display apparatus is limited. To address this issue, the present disclosure provides a light emitting display apparatus capable of increasing a range of the variable frequency.

The present disclosure is directed to providing a light emitting display apparatus that substantially obviates one or more problems due to limitations and disadvantages of the related art.

An aspect of the present disclosure is directed to providing a light emitting display apparatus which may delay a data enable signals when a frequency is increased.

Another aspect of the present disclosure is directed to providing a light emitting display apparatus which may selectively sense the driving transistor based on the magnitude of a frequency.

Another aspect of the present disclosure is directed to providing a light emitting display apparatus which may change a delay time of a data enable signal based on the magnitude of a frequency. In one aspect, a light emitting display apparatus includes a control driver configured to (1) delay a second data enable signal to an (n)th data enable signal by a delay period when a frequency of a first data enable signal is greater than a first reference frequency, and (2) convert input image data into image data, wherein n is a natural number greater than or equal to 2; a data driver configured to output data voltages by using the first data enable signal to the (n)th data enable signal and the image data transmitted from the control driver; and a light emitting display panel provided with pixels and data lines to which the data voltages are supplied.

In another aspect, the control driver is configured to complete a sensing operation for the pixels processed in a first frame corresponding to the first data enable signal during a delay period of the second data enable signal.

In another aspect, the control driver is configured to stop a sensing operation for the pixels in a second frame to an (n)th frame in which data voltages are output by the second data enable signal to the (n)th data enable signal.

In another aspect, the control driver is configured to determine whether the frequency of the first data enable signal is greater than the first reference frequency by counting a vertical blank period in which a data pulse is not generated in the first data enable signal.

In another aspect, the control driver is configured to delay the input image data corresponding to the second data enable signal to the (n)th data enable signal by the delay period when the second data enable signal to the (n)th data enable signal are delayed by the delay period.

In another aspect, the control driver includes: a delay portion configured to delay the second data enable signal to the (n)th data enable signal by the delay period when the frequency of the first data enable signal is greater than the first reference frequency; and a converting portion configured to convert the input image data to the image data and to transmit the image data and the first to the (n)th data enable signals transmitted from the delay portion to the data driver.

In another aspect, the delay portion includes: a counter configured to determine whether the frequency of the first data enable signal is greater than the first reference frequency by counting a vertical blank period of the first data enable signal; a multiplexer MUX configured to transmit the second data enable signal to the converting portion under the control of the counter when the frequency of the first data enable signal is less than or equal to the first reference frequency; and a buffer configured to (1) delay the second data enable signal transmitted through the MUX by the delay period according to control of the counter when the frequency of the first data enable signal is greater than the first reference frequency, and (2) transmit the delayed second data enable signal to the converting portion.

In another aspect, the delay period in which the second data enable signal and a third data enable signal are delayed is changed according to a magnitude of the frequency of the first data enable signal.

In another aspect, the control driver is configured to (1) not delay an (n+1)th data enable signal to an (m)th data enable signal when the frequency of the (n)th data enable signal is reduced to be less than or equal to the first reference frequency, and (2) perform a sensing operation for the pixels, wherein m is a natural number greater than n+1.

In another aspect, the control driver is configured to (1) not delay an (n+k+1)th data enable signal to an (m)th data enable signal when frequencies of the (n)th data enable signal to an (n+k)th data enable signal are reduced to be less than or equal to the first reference frequency, and (2) perform a sensing operation for the pixels, wherein m is a natural number greater than n+k+1, and k is a preset natural number.

In another aspect, the control driver is configured to stop a sensing operation for the pixels in a second frame to an (n)th frame in which data voltages are output by the second data enable signal to the (n)th data enable signal.

In another aspect, the control driver is configured to perform the sensing operation for the pixels in an (n+1)th frame to an (m)th frame in which data voltages are output by an (n+1)th data enable signal to the (m)th data enable signal when the frequency of the (n)th data enable signal is increased to be greater than the second reference frequency, wherein m is a natural number greater than n+1.

In another aspect, the (n+1)th data enable signal to the (m)th data enable signal are not delayed.

In one aspect, a light emitting display apparatus includes a control driver configured to: monitor a frequency of a first data enable signal of a plurality of data enable signals; and based on a comparison of the frequency of the first data enable signal to a threshold, control a timing of remaining data enable signals of the plurality of data enable signals; and convert input image data into image data. The light emitting display apparatus further includes a data driver configured to generate output data voltages based on the plurality of data enable signals and the image data; and a light emitting display panel provided with pixels and data lines to which the data voltages are supplied for displaying an image represented by the image data.

In another aspect, the control driver is configured to control the timing of the remaining data enable signals by determining that the frequency of the first data enable signal is greater than the threshold; and delaying the remaining data enable signals by a period when the frequency is greater than the threshold.

In another aspect, the control driver is configured to determine the frequency of the first data enable signal to be greater than the threshold by counting a vertical blank period of the first data enable signal.

In another aspect, the period is determined based on a magnitude of the frequency of the first data enable signal.

In another aspect, the control driver comprises a buffer and a multiplexer.

In another aspect, the multiplexer is configured to activate the buffer for delaying the remaining data enable signals by the period.

In another aspect, the control driver is configured to control the timing of the remaining data enable signals by determining that the frequency of the first data enable signal is equal to or less than the threshold; and not delaying the remaining data enable signals when the frequency is equal to or less than the threshold.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a light emitting display apparatus including a control driver which delays a second data enable signal to an (n)th data enable signal ('n' is a natural number greater than or equal to 2) by a predetermined delay period when a frequency of a first data enable signal is greater than a preset first reference frequency, and converts input image data into image data, a data driver which outputs data voltages by using the first to (n)th data enable signals and the image data transmitted from the control driver, and a light emitting display panel provided with pixels and data lines to which the data voltages are supplied.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
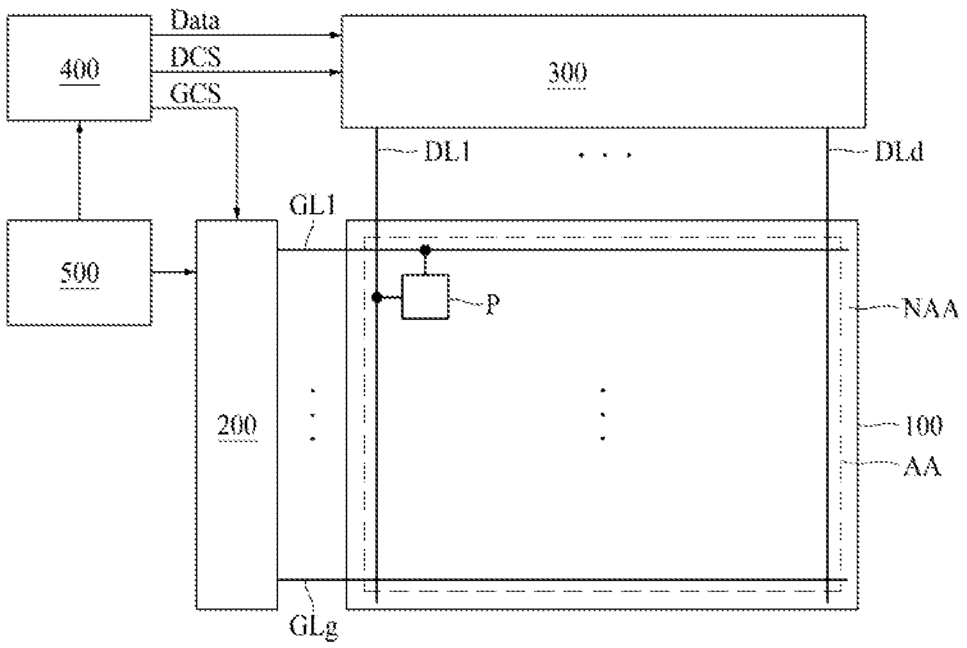
FIG. 1 is an exemplary diagram illustrating a configuration of a light emitting display apparatus according to an aspect of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Various examples of the present disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer may not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art may sufficiently understand. The embodiments of the present disclosure may be carried out independently from each other, or may be carried out together in co-dependent relationship.

Hereinafter, embodiments of the present disclosure will be described in detail with reference to the accompanying drawings.

Figure 2:
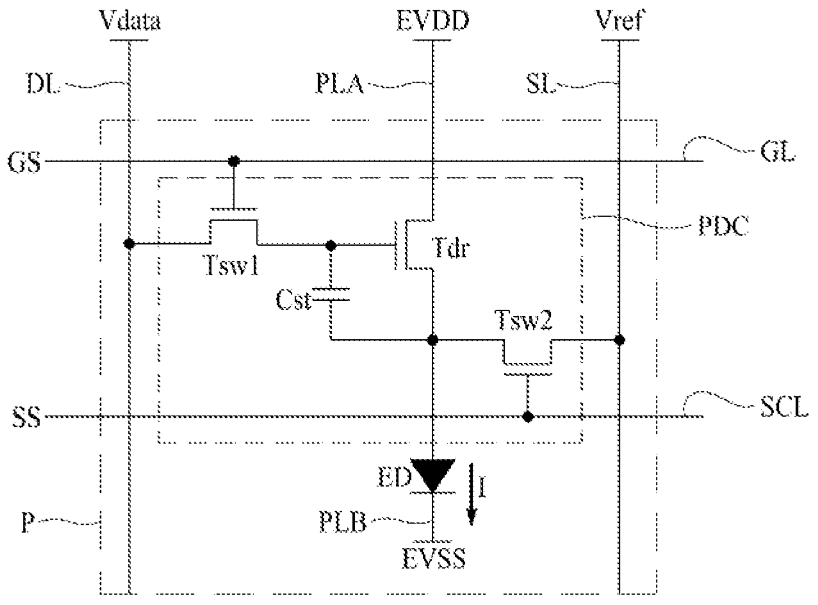
FIG. 2 is an exemplary diagram illustrating a structure of a pixel applied to a light emitting display apparatus according to an aspect of the present disclosure.
Figure 3:
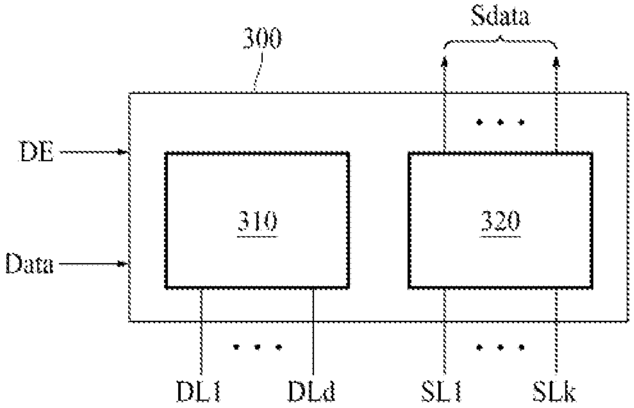
FIG. 3 is an exemplary diagram illustrating a structure of a data driver applied to a light emitting display apparatus according to an aspect of the present disclosure.
Figure 4:
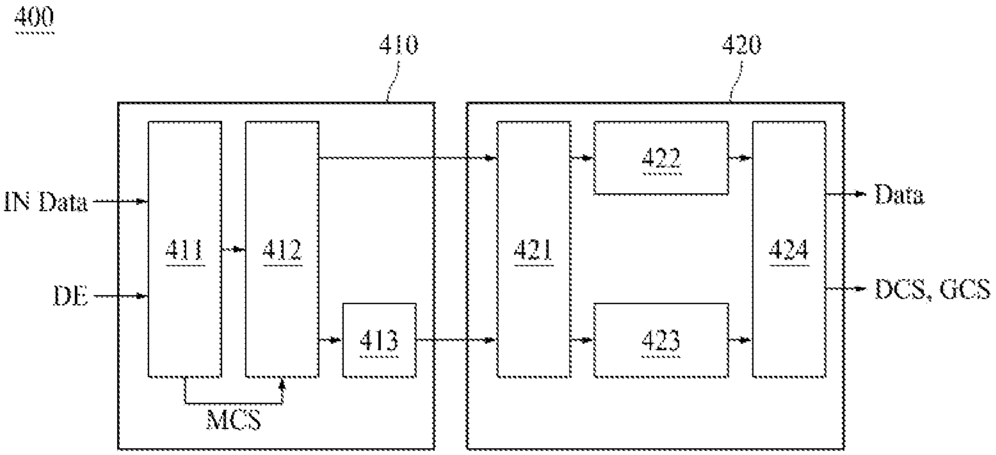
FIG. 4 is an exemplary diagram illustrating a structure of a control driver applied to a light emitting display apparatus according to an aspect of the present disclosure.

FIG. 1 is an exemplary diagram illustrating a configuration of a light emitting display apparatus according to an aspect of the present disclosure, FIG. 2 is an exemplary diagram illustrating a structure of a pixel applied to a light emitting display apparatus according to an aspect of the present disclosure, FIG. 3 is an exemplary diagram illustrating a structure of a data driver applied to a light emitting display apparatus according to an aspect of the present disclosure, and FIG. 4 is an exemplary diagram illustrating a structure of a control driver applied to a light emitting display apparatus according to an aspect of the present disclosure.

A display apparatus according to the present disclosure may be various electronic devices or configure various electronic devices. For example, the electronic device may be a smartphone, a tablet PC, a television, and a monitor, etc. Particularly, the electronic device may be used as a television or as a monitor. A monitor denotes, for example, an electronic device used as a display of a personal computer (PC) and a tablet PC. That is, a light emitting display apparatus according to the present disclosure may be used as a television, or may be connected to a personal computer (PC) and a tablet PC to be used as a display.

The light emitting display apparatus according to an aspect of the present disclosure, as illustrated in FIG. 1, may include a display panel 100 which includes a display area AA displaying an image and a non-display area NAA provided outside the display area AA, a gate driver 200 which supplies gate signals to a plurality of gate lines GL1 to GLg provided in the display area AA of the display panel 100, a data driver 300 which supplies data voltages to a plurality of data lines DL1 to DLd provided in the display panel 100, a control driver 400 which controls driving of the gate driver 200 and the data driver 300, and a power supply 500 which supplies power to the control driver 400, the gate driver 200, the data driver 300, and the light emitting display panel 100.

The light emitting display panel 100 includes a display area AA and a non-display area NAA. Gate lines GL1 to GLg, data lines DL1 to DLd, and pixels P are provided in the display area AA. Accordingly, an image is output in the display area AA. Here, g and d are natural numbers. The non-display area NAA surrounds the outer periphery of the display area AA.

The pixel P included in the light emitting display panel 100, as illustrated in FIG. 2, may include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr may be connected to a first voltage supply line PLA through which a first voltage EVDD is supplied, and a second terminal of the driving transistor Tdr may be connected to the light emitting device ED.

A first terminal of the switching transistor Tsw1 may be connected to a data line DL, a second terminal of the switching transistor Tsw1 may be connected to a gate of the driving transistor Tdr, and a gate of the switching transistor Tsw1 may be connected to a gate line GL.

A data voltage Vdata may be supplied to a data line DL, and a gate signal GS may be supplied to a gate line GL.

The sensing transistor Tsw2 may be provided for measuring a threshold voltage or mobility of the driving transistor Tdr. A first terminal of the sensing transistor Tsw2 may be connected to a second terminal of the driving transistor Tdr and the light emitting device ED, a second terminal of the sensing transistor Tsw2 may be connected to a sensing line SL through which the reference voltage Vref is supplied, and a gate of the sensing transistor Tsw2 may be connected to a sensing control line SCL through which a sensing control signal SS is supplied.

The sensing line SL may be connected to the data driver 300, or may be connected to the power supply 500 through the data driver 300. That is, the reference voltage Vref supplied from the power supply 500 may be supplied to pixels P through the sensing line SL, and sensing signals transmitted from the pixels may be processed by the data driver 300.

The light emitting device ED may include a first electrode supplied with a first voltage EVDD through the driving transistor Tdr, a second electrode connected to a second voltage supply line PLB supplied with a second voltage EVSS, and a light emitting layer provided between the first electrode and the second electrode.

A structure of the pixel P applied to the present disclosure is not limited to a structure illustrated in FIG. 2. Accordingly, a structure of the pixel P may be changed to have different shapes.

The gate driver 200 may be configured as an integrated circuit (IC) and mounted in the non-display area NAA. Further, the gate driver 200 may be directly embedded in the non-display area NAA by using a gate in panel (GIP) type. In a case which uses the GIP type, transistors configuring the gate driver 200 may be provided in the non-display area NAA through the same process as transistors included in each of the pixels P. Moreover, the gate driver may be provided in the display area AA in which light emitting display devices ED are provided.

The gate driver 200 may supply gate pulses to the gate lines GL1 to GLg.

When a gate pulse generated by the gate driver 200 is supplied to a gate of a switching transistor Tsw1 included in the pixel P, the switching transistor Tsw1 may be turned on. When the switching transistor Tsw1 is turned on, data voltage Vdata supplied through a data line may be supplied to the pixel P.

When a gate-off signal generated by the gate driver 200 is supplied to the switching transistor Tsw1, the switching transistor Tsw1 may be turned off. When the switching transistor Tsw1 is turned off, a data voltage may not be supplied to the pixel P any longer.

The gate signal GS supplied to the gate line GL may include the gate pulse GP and the gate-off signal.

The power supply 500 may generate various powers and may supply the generated powers to the control driver 400, the gate driver 200, the data driver 300, and the light emitting display panel 100.

The data driver 300 may be connected to data lines DL1 to DLd and sensing lines SL1 to SLk (k is a natural number less than or equal to d). For example, each of the sensing lines SL1 to SLk may be connected to a unit pixel capable of displaying a white color, but may be connected to one of pixels configuring the unit pixel.

When the data driver 300 includes a data voltage output unit 310 and a sensing unit 320, the data voltage output unit 310 may be connected to the data lines DL, and the sensing unit 320 may be connected to the sensing lines SL.

The data voltage output unit 310 may convert image data Data received from the control driver 400 into data voltages Vdata, and outputs data voltages Vdata to data lines DL1 to DLd.

In a vertical blank period, the sensing unit 320 may supply the reference voltage Vref to the pixels P during a period in which sensing is performed, and then generate sensing data Sdata by using signals transmitted from the sensing lines SL1 to SLk. During one vertical blank period, for example, sensing may be performed for pixels connected to one gate line GL. The sensing data Sdata may be transmitted to the control driver 400.

The sensing unit 320 may supply the voltage required for the pixel P to the pixel P through the sensing line SL and the sensing transistor Tsw2 even during the display period.

The control driver 400 may compensate for a variation of a threshold voltage or mobility of the driving transistor Tdr by using the sensing data Sdata. That is, the control driver 400 may generate image data by using the sensed threshold voltage or mobility, and thus, data voltages Vdata may be generated.

To provide an additional description, the light emitting display apparatus may include a display period in which an image is output and a vertical blank period between the display periods. In the vertical blank period, the mobilities of the driving transistors Tdr connected to one gate line GL may be sensed. To this end, the pixel P may be configured in a structure as illustrated in FIG. 2, and may be modified to have various other structures in addition to the structure illustrated in FIG. 2. Moreover, one of the various methods currently used for sensing the mobilities may be applied to the present disclosure.

A structure and a method for sensing the driving transistor may not be a feature of the present disclosure, and thus, detailed descriptions of a structure and a method for sensing the driving transistor are omitted.

In the present disclosure, the data driver 300 may output data voltages Vdata by using data enable signals DE and image data Data transmitted from the control driver 400.

The data enable signal DE is a signal which controls the timing when data voltages Vdata are generated, and is transmitted from the control driver 400 to the data driver 300.

Finally, the control driver 400 may realign input image data transmitted from an external system by using a timing synchronization signal transmitted from the external system and may generate data control signals DCS which are to be supplied to the data driver 300 and gate control signals GCS which are to be supplied to the gate driver 200.

The external system may perform a function of driving the control driver 400 and an electronic device. For example, when the electronic device is a monitor, the external system may be a personal computer (PC), a tablet PC, or the like.

Particularly, when a frequency of a first data enable signal is greater than a preset first reference frequency, the control driver 400 may delay a second data enable signal to an (n)th data enable signal ('n' is a natural number greater than or equal to 2) by a predetermined period (hereinafter simply referred to as a delay period, duration of which may be determined based on experiments and/or empirical studies), and convert input image data transmitted from the external system into image data.

To this end, as illustrated in FIG. 4, the control driver 400 may include a delay portion 410 configured to delay the second data enable signal to the (n)th data enable signal by the delay period when the frequency of the first data enable signal is greater than the first reference frequency. The control driver 400 may further includes a converting portion 420 configured to convert the input image data to the image data and to transmit the image data and the first to the (n)th data enable signals transmitted from the delay portion to the data driver 300.

The delay portion 410 may include a counter 411, a multiplexer (MUX) 412, and a buffer 413. The counter 411 may determine whether the frequency of the first data enable signal is greater than the first reference frequency by counting a vertical blank period of the first data enable signal. The MUX 412 may transmit the second data enable signal to the converting portion 420 under the control of the counter 411 when the frequency of the first data enable signal is less than or equal to the first reference frequency. The buffer 413 may delay the second data enable signal transmitted through the MUX 412 by the delay period according to the control of the counter when the frequency of the first data enable signal is greater than the first reference frequency, and transmits the delayed second data enable signal to the converting portion 420.

In the following description, the buffer 413 may perform a function of delaying the second data enable signal. In this case, the buffer 413 may be provided at the front end of the counter 411 or between the counter 411 and the MUX 412, or may be connected to the counter 411 like the MUX 412, or may be connected to the rear end of the MUX 412 as illustrated in FIG. 4.

When the buffer 413 is connected to the rear end of the MUX 412, the MUX 412 may perform a function of activating the buffer 413. That is, the MUX 412 may activate the buffer 413 to delay the second data enable signal and transmit the delayed data enable signal to the converting portion 420.

When the buffer 413 is provided at the front end of the MUX 412, the buffer 413 may store a delayed second data enable signal and a non-delayed second data enable signal. In this case, the MUX 412 may select a delayed second data enable signal or a non-delayed second data enable signal under the control of the counter 411, and transmit the selected or non-delayed second data enable signal to the converting portion 420.

That is, in the present disclosure, the buffer 413 may perform a function of storing the second data enable signal, and the buffer 413 may be provided at various position so that such a function may be performed. In this case, the MUX 412 may activate the buffer 413 to directly delay the second data enable signal and transmit it to the converting portion 420, or may select the second data enable signal delayed by the buffer 413 to transmit the delayed second data enable signal to the converting portion 420. Hereinafter, for convenience of description, a light emitting display apparatus in which the buffer 413 is provided at the rear end of the MUX 412 will be described as an example of the light emitting display apparatus according to the present disclosure.

The converting portion 420 may include a controller 421 receiving data enable signals and input image data from the delay portion 410, and a data aligner 423 realigning input image data transmitted from the controller 421 to generate image data Data and supply the image data to the data driver 300. The converting portion 420 may further includes a control signal generator 422 generating a gate control signal GCS and a data control signal DCS by using a timing synchronization signal, and an output portion 424 supplying image data Data generated by the data aligner 423 and data control signals DCS generated by the control signal generator 422 to the data driver 300 and outputting gate control signals GCS generated by the control signal generator 422 to the gate driver 200. The data control signals DCS may include a data enable signal DE.

Figure 5:
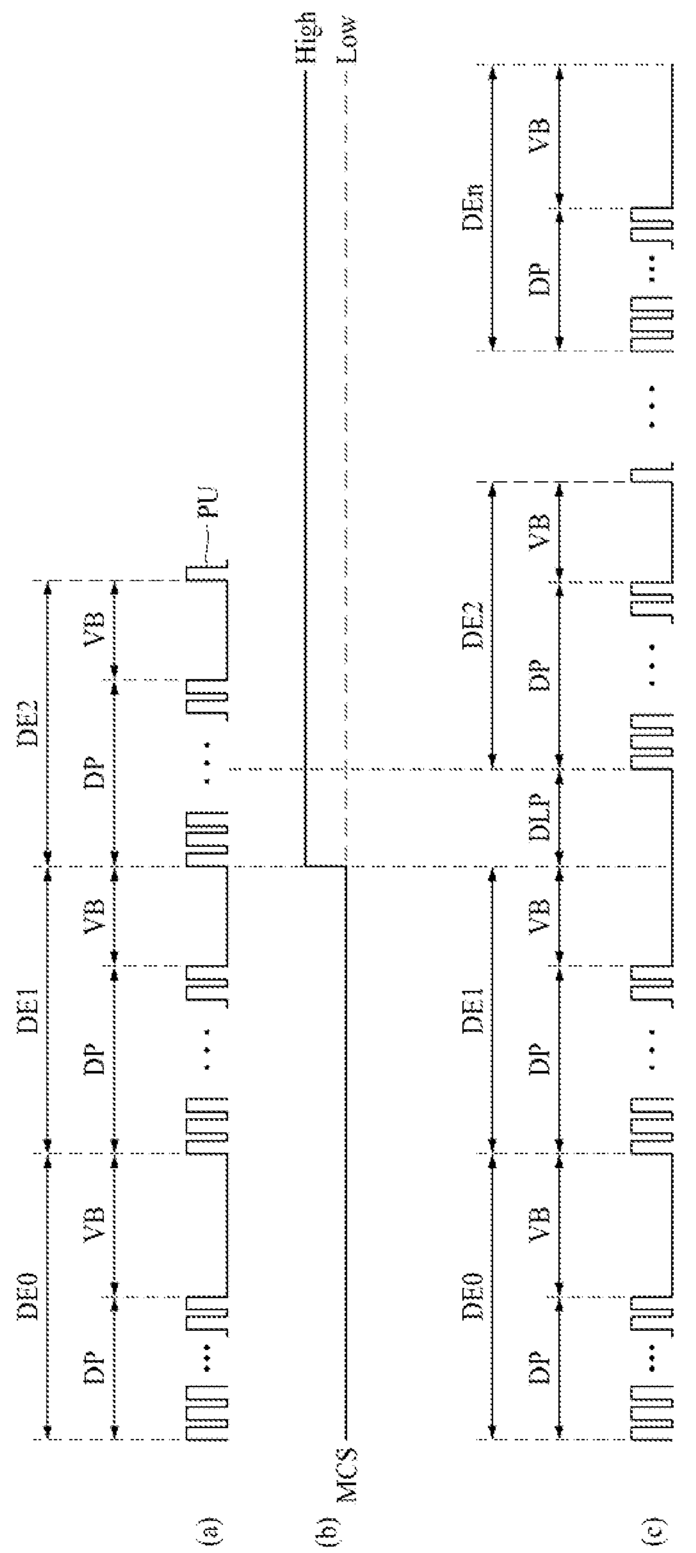
FIGS. 5 to 9 are exemplary diagrams for describing a method of operating a light emitting display apparatus according to an aspect of the present disclosure.
Figure 6:
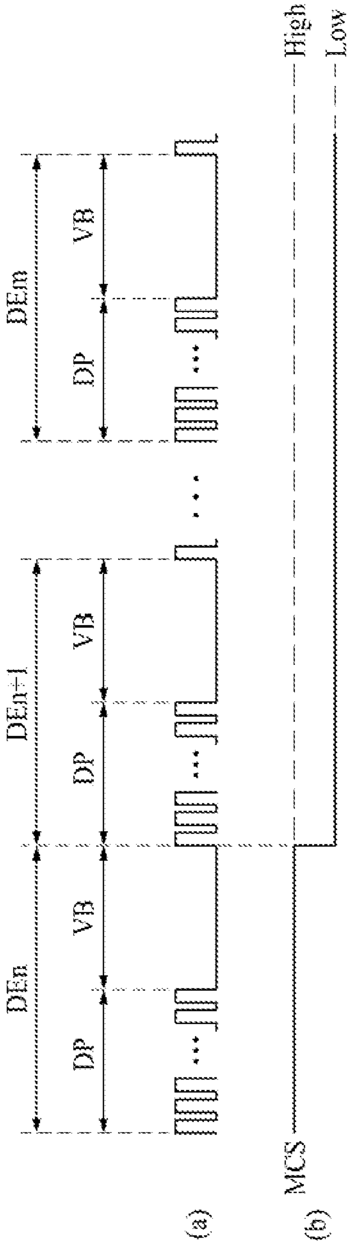
Figure 7:
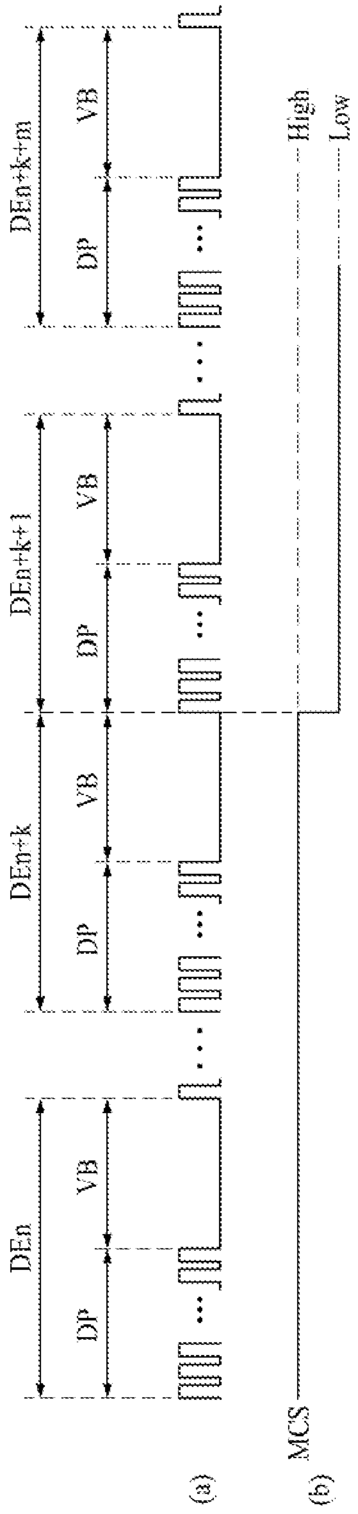
Figure 8:
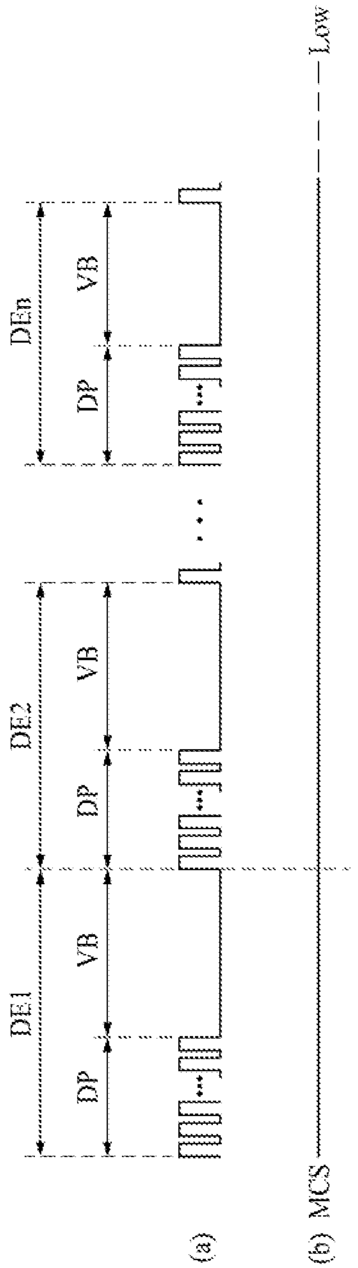
Figure 9:
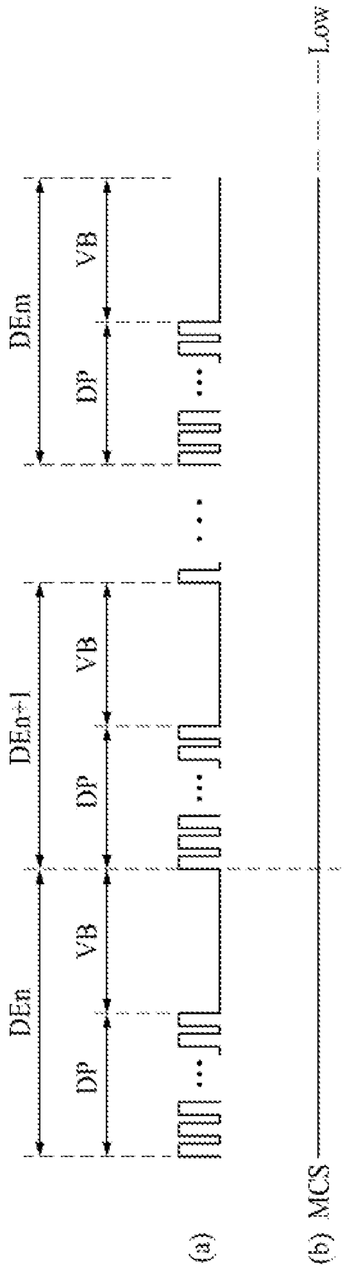
Figure 10:
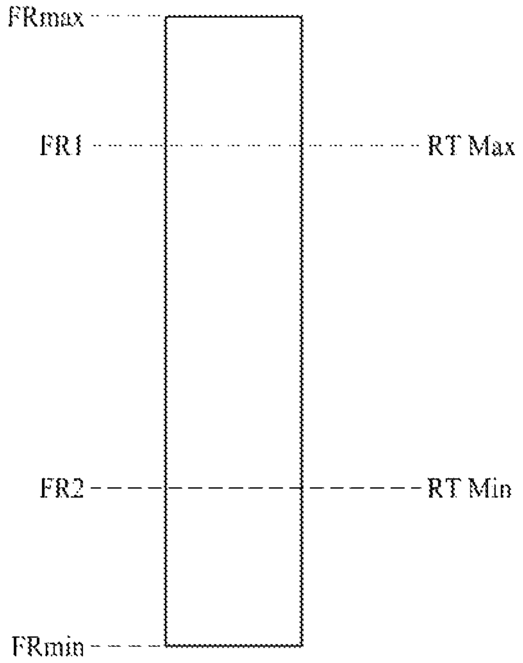
FIG. 10 is an exemplary diagram illustrating a range of frequencies applied to a light emitting display apparatus according an aspect of to the present disclosure.

FIGS. 5 to 9 are exemplary diagrams for describing a method of operating a light emitting display apparatus according to an aspect of the present disclosure, and FIG. 10 is an exemplary diagram illustrating a range of frequencies applied to a light emitting display apparatus according to an aspect of the present disclosure. In particular, FIG. 5 illustrates an example in which a frequency of a data enable signal is greater than a first reference frequency, FIGS. 6 and 7 illustrate an example in which a frequency of a data enable signal decreases to a frequency less than or equal to the first reference frequency at a frequency greater than the first reference frequency, FIG. 8 illustrates an example in which a frequency of a data enable signal is smaller than a second reference frequency, and FIG. 9 illustrates an example in which a frequency of a data enable signal is increased to a frequency equal to or greater than the second reference frequency at a frequency less than the second reference frequency.

As described above, a control driver 400 includes a delay portion 410 and a converting portion 420.

The delay portion 410 includes a counter 411, a MUX 412, and a buffer 413. The converting portion 420 includes a controller 421, a data aligner 423, a control signal generator 422, and an output portion 424.

Hereinafter, a detailed structure and function of the control driver 400 will be described in detail with reference to FIGS. 4 to 9.

First, as shown in FIG. 5, when a frequency of a first data enable signal DE1 transmitted from an external system is greater than a preset first reference frequency FR1, the control driver 400 delays a second data enable signal DE2 to an (n)th data enable signal DEn by a predetermined period (hereinafter, referred to as a delay period) DLP.

To this end, the counter 411 counts a vertical blank period VB of the first data enable signal DE1, and determines whether the frequency of the first data enable signal DE1 is greater than the first reference frequency FR1.

The data enable signal DE is a signal for controlling the timing at which data voltages Vdata are generated. That is, the data enable signal DE is transmitted from the control driver 400 to the data driver 300, and the data driver 300 may generate the data voltages according to the timing at which data pulses PU constituting the data enable signal DE rise.

In addition, the counter 411 of the control driver 400 may count the vertical blank period VB in which the data pulse PU is not generated during the first data enable signal DE1 and may determine whether the frequency of the first data enable signal DE1 is greater than the first reference frequency FR1.

In the following description, a (0)th data enable signal DE0, the first data enable signal DE1, the second data enable signal DE2, the (n)th data enable signal DEn, and the like refer to an order of the data enable signal DE, and the data enable signal DE may be used to collectively refer to the (0)th data enable signal DE0, the first data enable signal DE1, the second data enable signal DE2, the (n)th data enable signal DEn, and the like. Data enable signal DE may also be used to collectively refer to any one of the (0)th data enable signal DE0, the first data enable signal DE1, the second data enable signal DE2, the (n)th data enable signal DEn, and the like.

The data enable signal DE, that is, each of the (0)th data enable signal DE0, the first data enable signal DE1, the second data enable signal DE2, and the (n)th data enable signal DEn may include a display period DP and a vertical blank period VB, as shown in (a) and (c) of FIG. 5.

The data pulses PU are provided in the display period DP, and the data voltages may be generated in the data driver 300 when the data pulses PU rise, as described above.

The vertical blank period VB refers to a period in which data pulses PU are not provided.

The display period DP may correspond to a display apparatus display period, and the vertical blank period VB may correspond to a display apparatus vertical blank period. The display apparatus display period refers to the period in which the data voltages generated according to the data pulses PU are output to a light emitting display panel 100 and an image is output from the light emitting display panel 100. The display apparatus vertical blank period refers to the period in which an image is not outputted to the light emitting display panel 100 because the data voltages are not outputted from the light emitting display panel 100. The display apparatus display period and the display apparatus vertical blank period form one frame period. That is, one image is outputted from the light emitting display panel 100 during one frame period.

In the following description, a first frame can mean a first one frame period, and a second frame period can mean a second one frame period. That is, the first frame and the second frame can mean an order in which one frame period is generated, and the one frame period can mean the period of each of the first frame and the second frame. Therefore, one image is outputted through the light emitting display panel 100 in each of the first frame and the second frame.

In one non-limiting example, the size of the display period DP and the size of the vertical blank period VB may correspond to the size of the display apparatus display period and the size of the display apparatus vertical blank period.

Also, the display period DP and the vertical blank period VB are divided based on whether the data pulses PU are output in the data enable signal DE inputted to the control driver 400, and the display apparatus display period and the display apparatus vertical blank period are divided based on whether the data voltages Vdata generated by the data driver 300 are output to the light emitting display panel 100 by the data enable signal DE, so that the start timing of the display period DP and the start timing of the vertical blank period VB may not coincide with the start timing of the display apparatus display period and the start timing of the display apparatus vertical blank period.

That is, since a predetermined time delay occurs until the data enable signal DE inputted to the control driver 400 is transmitted to the data driver 300 through the control driver 400 and is used to generate the data voltages Vdata, the start timing of the display period DP and the start timing of the vertical blank period VB may not coincide with the start timing of the display apparatus display period and the start timing of the display apparatus vertical blank period.

However, the size of the display apparatus display period and the size of the display apparatus vertical blank period correspond to the size of the display period DP and the size of the vertical blank period VB, and the start timing of the display apparatus display period and the start timing of the display apparatus vertical blank period correspond to the start timing of the display period DP and the start timing of the vertical blank period VB.

In other words, the size of the display apparatus display period is increased by the increase in the size of the display period DP, and the size of the vertical blank period VB and the size of the display apparatus vertical blank period are reduced by the increase in the size of the display period DP.

Also, the start timing of the display apparatus display period and the start timing of the display apparatus vertical blank period become fast according as the start timing of the display period DP and the start timing of the vertical blank period VB are fast. The start timing of the display apparatus display period and the start timing of the display apparatus vertical blank period become slow according as the start timing of the display period DP and the start timing of the vertical blank period VB are slow.

Therefore, for convenience of description, one aspect of the present disclosure is described under the assumption that the display period DP and the vertical blank period VB coincide with the display apparatus display period and the display apparatus vertical blank period, and the start timing of the display period DP and the start timing of the vertical blank period VB coincide with the start timing of the display apparatus display period and the start timing of the display apparatus vertical blank period.

Thus, hereinafter, the display apparatus display period and the display apparatus vertical blank period are described as the display period DP and the vertical blank period VB.

The preset first reference frequency FR1 refers to a maximum sensing frequency RT Max through which sensing operations for sensing a mobility or a threshold voltage of a driving transistor Tdr may be performed.

The sum of the display period DP and the vertical blank period VB constituting the data enable signal DE is reduced when the frequency is increased. In this case, the display period DP is constant regardless of frequency. Thus, when the frequency is increased, the vertical blank period VB is reduced.

In this case, when the light emitting display apparatus for sensing the mobility of the driving transistor Tdr is driven at a frequency greater than the first reference frequency FR1 in the vertical blank period VB, the vertical blank period VB becomes shorter than a period during which the sensing operation is performed, and accordingly, whereby the sensing operation is not completely performed in the vertical blank period VB.

Thus, the maximum frequency at which the sensing operation is performed is set to the first reference frequency FR1. For example, the first reference frequency FR1 may be 138 Hz.

The counter 411 counts the vertical blank period VB of the first data enable signal DE1, and determines whether the frequency of the first data enable signal DE1 is greater than the first reference frequency FR1.

As described above, the sum of the display period DP and the vertical blank period VB constituting the data enable signal DE is changed when the frequency is changed, and the vertical blank period VB is changed. Therefore, when the period from the timing at which the data pulse PU is not output to the timing at which the data pulse PU is output again is counted, the vertical blank period VB may be determined. Accordingly, the frequency of the first data enable signal DE1 may be determined. Thus, it may be determined whether the frequency of the first data enable signal DE1 is greater than the first reference frequency FR1.

When the frequency of the first data enable signal DE1 is greater than the first reference frequency FR1, the second to (n)th data enable signals DE2 to DEn are delayed by a delay period DLP.

In other words, if it is determined that the frequency of the first data enable signal DE1 is greater than the first reference frequency FR1, the counter 411 transmits a MUX control signal MCS to the MUX 412 to transmit the second to (n)th data enable signals DE2 to DEn to the buffer 413.

For example, as shown in (b) of FIG. 5, when a high-level MUX control signal MCS is received from the counter 411, the MUX 412 transmits the second to (n)th data enable signals DE2 to DEn to the buffer 413. Accordingly, the second to (n)th data enable signals DE2 to DEn are delayed by the delay period DLP in the buffer 413 and then outputted to the converting portion 420.

In this case, the first data enable signal DE1 is directly transmitted to the converting portion 420 without being transmitted to the buffer 413. Thus, as shown in (c) of FIG. 5, after the delay period DLP after the first data enable signal DE1 is transmitted to the converting portion 420, the second data enable signal DE2 may be transmitted to the converting portion 420.

That is, (a) of FIG. 5 shows the data enable signals DE supplied to the counter 411, (b) of FIG. 5 shows the MUX control signal MCS, and (c) of FIG. 5 shows the data enable signals DE supplied to the converting portion 420. As shown in (a) of FIG. 5, based on a result of counting the vertical blank period VB of the first data enable signal DE1, when it is determined that the frequency of the first data enable signal DE1 is greater than the first reference frequency FR1, the MUX control signal MCS having a high level is transmitted to the MUX 412, as shown in (b) of FIG. 5, whereby the MUX 412 transmits the second to (n)th data enable signals DE2 to DEn to the buffer 413. The second to (n)th data enable signals DE2 to DEn are delayed by the buffer 413. Accordingly, as shown in (c) of FIG. 5, when the delay period DLP is elapsed after the first data enable signal DE1 is supplied to the converting portion 420, the second data enable signal DE2 is supplied to the converting portion 420.

The control driver 400, more particularly, the controller 421 completes a sensing operation performed in the first frame corresponding to the first data enable signal DE1 during the period in which the second data enable signal DE2 is delayed by the buffer 413, that is, during the delay period DLP.

For example, when the display period DP and the vertical blank period VB of the first data enable signal DE1 constitute the first frame, the mobility of the driving transistors Tdr provided in the pixels P connected to at least one gate line GL is sensed during the vertical blank period VB of the first frame.

As described with reference to FIG. 3, the reference voltage Vref is supplied to the pixels P in the vertical blank period VB of the first frame, the data driver 300 generates sensing data Sdata by using the sensing signals transmitted from the pixels P, and the sensing data Sdata is transmitted to the control driver 400. The control driver 400 may convert input image data IN Data by using the sensing data Sdata.

To this end, the control driver 400, more particularly, the controller 421, controls the data driver 300 and the gate driver 200 in the vertical blank period VB of the first frame.

In this case, the frequency of the first data enable signal DE1 being greater than the first reference frequency FR1 means that the vertical blank period VB of the first data enable signal DE1 is smaller than the period in which the sensing operation is performed, whereby the sensing operation is not completely performed in the vertical blank period VB of the first frame.

The counter 411 transmits the high-level MUX control signal MCS to the MUX 412 to completely perform the sensing operation in the vertical blank period VB of the first frame corresponding to the first data enable signal DE1. Accordingly, the MUX 412 transmits the second data enable signal DE2 to the buffer 413.

The vertical blank period VB of the first data enable signal DE1 is maintained by the delay period DLP which is delayed by the second data enable signal transmitted to the buffer 413.

In this case, the delay period DLP may be set in consideration of the vertical blank period VB of the first data enable signal DE1 and the period during which the sensing operation is performed.

For example, the vertical blank period VB of the data enable signal DE using the maximum frequency capable of being used in the light emitting display apparatus may be a minimum value of the vertical blank period used in the light emitting display apparatus.

Thus, the delay period DLP may be set so that the combined period of the vertical blank period VB and the delay period DLP of the data enable signal DE using the maximum frequency FRmax may be greater than or equal to the minimum value at which the sensing operation may be performed.

Therefore, the sensing operation of the first frame may be completed during the sum of the vertical blank period VB and the delay period DLP of the first frame.

However, the delay period DLP may be variously changed according to the magnitude of the frequency of the first data enable signal DE1.

As described above, the delay period DLP may be set so that the sum of the vertical blank period VB and the delay period DLP of the data enable signal DE using the maximum frequency FRmax may be greater than or equal to the minimum value at which the sensing operation may be performed.

In one example, the vertical blank period VB of the first data enable signal using the first reference frequency FR1 through which the sensing operation may be performed is greater than the vertical blank period VB of the first data enable signal using the maximum frequency FRmax. Thus, the sum of the delay period DLP generated in consideration of the maximum frequency FRmax and the vertical blank period VB of the data enable signal using the first reference frequency FR1 may be sufficiently greater than the minimum value at which the sensing operation may be performed. Accordingly, when the first data enable signal uses the first reference frequency FR1, the delay period DLP may be reduced compared to the delay period DLP when the first data enable signal uses the maximum frequency FRmax. That is, the delay period DLP may be set to the same value for all data enable signals DE, however, the delay period DLP may be set differently depending on the frequency of the data enable signal DE.

When the delay period DLP is reduced, an interval between a time point at which one image is output by the first data enable signal and a time point at which another image is output by the second data enable signal may be reduced. Thus, if the frequency is increased, an image quality may be improved.

In addition, based on the above-descried principle, the delay period when the first data enable signal DE1 is greater than the first reference frequency FR1 and is less than the maximum frequency FRmax may be set to a value which is greater than the delay period DLP when the first data enable signal DE1 uses the first reference frequency FR1 and is smaller than the delay period DLP when the first data enable signal DE1 uses the maximum frequency FRmax.

In other words, in one aspect of the present disclosure, the delay period DLP may be variously changed according to the magnitude of the frequency of the first data enable signal DE1.

To this end, the counter 411 may control the delay period DLP of the buffer 413 according to the frequency of the first data enable signal DE1.

The control driver 400 may stop the sensing operation for the pixels in the second to (n)th frames from which the data voltages are outputted by the second to (n)th data enable signals DE2 to DEn.

For example, the delay of the second to (n)th data enable signals DE2 to DEn by the delay period DLP means that the frequency of the second to (n)th data enable signals DE2 to DEn is greater than the first reference frequency FR1. The frequency of the second to (n)th data enable signals DE2 to DEn being greater than the first reference frequency FR1 means that the vertical blank period VB of the second to (n)th data enable signals DE2 to DEn is shorter than the period in which the sensing operation may be performed.

Therefore, the controller 421 of the control driver 400 may stop the sensing operation for the pixels in the second to (n)th frames from which the data voltages are outputted by the second to (n)th data enable signals DE2 to DEn. To this end, the controller 421 of the control driver 400 may not drive the data driver 300 and the gate driver 200 in the vertical blank periods VB of the second to (n)th frames.

When the second to (n)th data enable signals DE2 to DEn are delayed by the delay period DLP, the control driver 400 may delay the input image data IN Data corresponding to the second to (n)th data enable signals DE2 to DEn by the delay period DLP.

For instance, when the data enable signals are transmitted from the external system, the input image data IN Data corresponding to the data enable signals are also transmitted from the external system.

Accordingly, the input image data IN Data corresponding to the delayed second data enable signal to the (n)th data enable signal DEn are also delayed by the delay period DLP.

In one example, when the frequency of the (n)th data enable signal DEn is reduced to be less than or equal to the first reference frequency FR1, the control driver 400 does not delay the (n+1)th data enable signal DEn+1 to the (m)th data enable signal DEm ('m' is a natural number greater than 'n+1').

As shown in (a) of FIG. 6, the counter 411 determines the frequency of the (n)th data enable signal DEn by counting the vertical blank period VB of the (n)th data enable signal DEn. When it is determined that the frequency of the (n)th data enable signal DEn is less than or equal to the first reference frequency FR1, the counter 411 transmits the MUX control signal MCS of low level to the MUX 412, as shown in (b) of FIG. 6.

Accordingly, the MUX 412 directly transmits the (n+1)th data enable signal DEn+1 to the (m)th data enable signal DEm to the converting portion 420 instead of the buffer 413. Thus, the (n+1)th data enable signal DEn+1 to the (m)th data enable signal DEm are not delayed but are transmitted to the converting portion 420.

Moreover, when the vertical blank period VB of the (n)th data enable signal DEn is counted, the MUX control signal has the high level, whereby the (n)th data enable signal DEn is transmitted to the buffer 413 and is delayed by the delay period DLP and then transmitted to the converting portion 420. That is, even if the frequency of the (n)th data enable signal DEn is less than or equal to the first reference frequency FR1, the (n)th data enable signal DEn is delayed.

In one example, if it is determined that the frequency of the (n)th data enable signal DEn is equal to or less than the first reference frequency FR1, the (n+1)th data enable signal DEn+1 to the (m)th data enable signal DEm are transmitted to the converting portion 420 without passing through the buffer 413.

In this instance, the controller 421 may receive a signal indicating that the (n+1)th data enable signal DEn+1 is not delayed or a signal indicating that the frequency of the (n+1)th data enable signal DEn+1 is less than or equal to the first reference frequency FR1 from the delay portion 410 or the counter 411. Accordingly, the controller 421 may perform the sensing operation during the (n+1)th frame to the (m)th frame corresponding to the (n+1)th data enable signal DEn+1 to the (m)th data enable signal DEm.

Thereafter, the control driver 400 does not delay the (n+k+1)th data enable signal to the (m)th data enable signal DEm ('m' is a natural number greater than 'n+k+1') when the frequencies of the (n)th data enable signal DEn to the (n+k)th data enable signals DEn+k ('k' is a preset natural number) are reduced to be less than the first reference frequency FR1.

For example, in the aspect with reference to FIG. 6, the counter 411 determines whether the frequency of the (n) th data enable signal DEn is reduced to less than or equal to the first reference frequency FR1. Based on the determination result, if the frequency of the (n) th data enable signal DEn is reduced to less than or equal to the first reference frequency FR1, the counter 411 does not delay the (n+1) th data enable signal DEn+1 to the (m) th data enable signal DEm.

In this case, if the frequency of the (n)th data enable signal DEn is reduced, and the frequency of the (n+1)th data enable signal DEn+1 becomes greater than the first reference frequency FR1, the sensing operation is performed in the (n+1)th frame corresponding to the (n+1)th data enable signal DEn+1, and the delay operation for the (n+1)th data enable signal DEn+1 is performed again.

In one example, if it is determined whether the frequency of the data enable signal DE is reduced to be less than the first reference frequency FR1 by using only one data enable signal DE, as described above, the sensing operation and the delay operation may be continuously repeated. Accordingly, driving of the light emitting display apparatus may be complicated and an error may occur in the sensing operation.

To prevent this problem, according to one aspect of the present disclosure, as shown in (a) of FIG. 7, the frequencies of the (n) th data enable signal DEn to the (n+k) th data enable signal DEn+k are determined by counting the vertical blank periods VB of the (n) th data enable signal DEn to the (n+k) th data enable signal DEn+k ('k' is a preset natural number). If it is determined that the frequencies of the (n) th data enable signal DEn to the (n+k) th data enable signal DEn+k are less than or equal to the first reference frequency FR1, the MUX control signal MCS of the low level is transmitted to the MUX 412, as shown in (b) of FIG. 7.

Accordingly, the MUX 412 directly transmits the (n+k+1)th data enable signal DEn to the (m)th data enable signal DEm to the converting portion 420 instead of the buffer 413.

On assumption that at least one of the (n)th data enable signal DEn to the (n+k)th data enable signal DEn+k is greater than the first reference frequency FR1, if the number of the data enable signals DE having the frequency greater than the first reference frequency FR1 is less than or equal to a preset value, and the frequency of the (n+k)th data enable signal DEn+k is equal to or less than the first reference frequency FR1, the counter 411 may transmit the MUX control signal MCS of the low level to the MUX 412, as shown in (b) of FIG. 7.

According to the aspect of the present disclosure, as described above, when a process of changing the frequency of the data enable signal DE up and down with respect to the first reference frequency FR1 is repeated, the sensing operation is not performed. The sensing operation is performed only when the frequency of the data enable signal DE is determined to be equal to or less than the first reference frequency FR1.

It is possible to prevent a problem in which driving of the light emitting display apparatus is complicated or an error occurs in the sensing operation.

Next, the control driver 400 stops the sensing operation for the pixels in the second frame to the (n)th frame in which the data voltages are outputted by the second to (n)th data enable signals DE2 to DEn when the frequency of the first data enable signal DE1 is smaller than the preset second reference frequency FR2.

In the aspect described with reference to FIGS. 5 to 7, the frequency of the first data enable signal DE1 is increased or decreased with respect to the first reference frequency FR1.

In one example, if the frequency of the first data enable signal DE1 is greater than the first reference frequency FR1, the sensing operation is stopped. If the frequency of the first data enable signal DE1 is reduced again below the first reference frequency FR1, the sensing operation is performed.

In one example, if the frequency of the first data enable signal DE1 is greater than the first reference frequency FR1, the sensing operation is stopped because there is no sufficient period for the sensing operation to be performed.

In one example, even when the frequency of the first data enable signal DE1 becomes smaller than the second reference frequency FR2, the sensing operation needs to be stopped. That is, the second reference frequency FR2 means a minimum sensing frequency RT Min at which the sensing operation may be performed, and may be variously changed according to the characteristics of the light emitting display apparatus.

For instance, when the frequency of the first data enable signal DE1 becomes smaller than the second reference frequency FR2, a speed at which an image is output and a speed at which the sensing operation is performed may be reduced. Therefore, when the sensing operation is performed in the vertical blank period VB, a defect in which a sensing line is shown may occur.

To prevent the defect of showing the sensing line from occurring when the frequency of the first data enable signal DE1 becomes smaller than the second reference frequency FR2, the control driver 400 may stop the sensing operation when the frequency of the first data enable signal DE1 becomes smaller than the second reference frequency FR2.

For example, the counter 411 may transmit a control signal for stopping the sensing operation to the controller 421 when the magnitude of the vertical blank period VB of the first data enable signal DE1 increases due to the frequency of the first data enable signal DE1 being less than the preset second reference frequency FR2, as shown in (a) of FIG. 8. Accordingly, the controller 421 may stop the sensing operation for the pixels in the second to (n)th frames from which the data voltages are outputted by the second to (n)th data enable signals DE2 to DEn. In this case, as shown in (b) of FIG. 8, the counter 411 maintains the MUX control signal MCS at the low level.

In one example, the increase of magnitude in the vertical blank period VB means that the period in which sensing may be performed becomes large, and the increase of the vertical blank period VB of the first data enable signal DE1 means that the sensing operation in the first frame may be normally terminated.

Therefore, the second to (n)th data enable signals DE2 to DEn need not be delayed. Accordingly, the counter 411 maintains the MUX control signal MCS at the low level, as shown in (b) of FIG. 8.

In one example, the control driver 400 may perform the sensing operation for the pixels in the (n+1)th frame to the (m)th frame in which the data voltages are outputted by the (n+1)th data enable signal DEn+1 to the (m)th data enable signal DEm ('m' is a natural number greater than 'n+1') after the sensing operation in the second to (n)th frames is stopped.

The increase of the frequency of the (n)th data enable signal DEn to be greater than the second reference frequency FR2 means that the sensing line is not seen when the sensing operation is performed.

Herein, the sensing operation may be set to start when the frequency of the (n)th data enable signal DEn is greater than or equal to the second reference frequency FR2, or may be set to start when the frequency of the (n)th data enable signal DEn is greater than the second reference frequency FR2.

For example, the counter 411 may transmit a control signal for performing the sensing operation to the controller 421 when the frequency of the (n)th data enable signal DEn shown in (a) of FIG. 9 is increased to be greater than the second reference frequency FR2. Accordingly, the controller 421 may perform the sensing operation for the pixels in the (n+1)th frame to the (m)th frame in which the data voltages are outputted by the (n+1)th data enable signal DEn+1 to the (m)th data enable signals DEm.

As shown in (b) of FIG. 9, the counter 411 maintains the MUX control signal MCS at the low level. Accordingly, the (n+1)th data enable signal DEn+1 to the (m)th data enable signal DEm are not delayed.

In one example, although the frequency of the (n)th data enable signal DEn is greater than the second reference frequency FR2, the sensing operation is not performed in the (n)th frame corresponding to the (n)th data enable signal DEn. Also, since the vertical blank period of the (n)th data enable signal DEn is sufficiently large, it is not required to extend the vertical blank period VB of the (n)th data enable signal DEn.

Thus, as shown in (b) of FIG. 9, the counter 411 maintains the MUX control signal MCS at the low level. Accordingly, the (n+1)th data enable signal DEn+1 to the (m)th data enable signal DEm are not delayed.

Finally, the effect of the present disclosure is described with reference to FIG. 10.

As described above, when the frequency of the data enable signal DE is greater than the first reference frequency FR1, the vertical blank period VB in which the sensing operation may be performed is not ensured, whereby the sensing operation should be stopped. When the frequency of the data enable signal DE becomes smaller than the second reference frequency FR2, the sensing line is shown, whereby the sensing operation should be stopped.

Therefore, the first reference frequency FR1 may be the maximum sensing frequency RT Max at which the sensing operation may be performed, and the second reference frequency FR2 may be the minimum sensing frequency RT Min at which the sensing operation may be performed.

In a related art light emitting display apparatus, there is no function of stopping the sensing operation as described in this specification. Therefore, in the related art light emitting display apparatus using a variable refresh rate VRR mode, data enable signals having frequencies between the first reference frequency FR1 and the second reference frequency FR2 may be used.

In one example, in the light emitting display apparatus according to the present disclosure, the sensing operation may be stopped when the data enable signal having the frequency greater than the first reference frequency FR1 is received, and the sensing operation may be stopped even when the data enable signal having the frequency smaller than the second reference frequency FR2 is received.

In one example, in the light emitting display apparatus according to the present disclosure, data enable signals having frequencies between the maximum frequency FRmax greater than the first reference frequency FR1 and the minimum frequency FRmin smaller than the second reference frequency FR2 may be used.

Accordingly, a frequency range used in the light emitting display apparatus according to the present disclosure is larger than a frequency range used in the related art light emitting display apparatus. Therefore, the light emitting display apparatus according to the present disclosure may express an image by using various frequencies in a variable frequency mode, thereby improving a picture quality.

Hereinafter, an operation method of the light emitting display apparatus according to the present disclosure is briefly described. Hereinafter, the light emitting display apparatus which may be used as a television and may be used as a display while being connected to a personal computer PC and a tablet PC may be described as embodiments of the present disclosure.

First, when the light emitting display apparatus according to the present disclosure is connected to a computer PC (external system), a menu capable of selecting whether to execute a variable frequency (variable refresh rate) VRR mode may be output manually or automatically through the light emitting display apparatus. In this case, a user may select the variable refresh rate VRR mode.

Then, when the variable refresh rate VRR mode is executed, the computer PC may output images by using the variable frequency.

For example, when a game is executed in the computer, there may be images changed at a high speed among images provided from the game, and there may be images changed at a low speed.

In one example, the computer may output an image by changing a frequency in a frequency range applicable to the light emitting display apparatus, for example, a maximum frequency range to a minimum frequency range shown in FIG. 10.

In one example, when the computer changes the frequency in the range of the first reference frequency FR1 to the second reference frequency FR2, the light emitting display apparatus may perform the sensing operation.

In one example, if the computer outputs an image by using a frequency less than or equal to the first reference frequency FR1 and outputs an image by using a frequency greater than the first reference frequency FR1, functions described with reference to FIG. 5 are performed.

In one example, when it is determined that the frequency of the first data enable signal DE1 transmitted from the computer is greater than the first reference frequency FR1, the light emitting display apparatus delays the second to (n)th data enable signals DE2 to DEn and does not perform the sensing operation in the second to (n)th frames corresponding to the second to (n)th data enable signals DE2 to DEn.

In one example, if the computer outputs an image by using a frequency greater than the first reference frequency FR1 and outputs an image by using a frequency less than or equal to the first reference frequency FR2, functions described with reference to FIGS. 6 and 7 are performed.

In one example, when the frequency of the (n)th data enable signal DEn is reduced to be less than or equal to the first reference frequency FR1, the light emitting display apparatus does not delay the (n+1)th data enable signal DEn+1 to the (m)th data enable signal DEm, and may perform the sensing operation for the pixels.

In one example, when the frequencies of the (n)th data enable signal DEn to the (n+k)th data enable signal DEn+k are reduced to be less than or equal to the first reference frequency FR1, the light emitting display apparatus does not delay the (n+k+1)th data enable signal DEn+k+1 to the (m)th data enable signal DEm, and may perform the sensing operation for the pixels.

In one example, if the computer outputs an image by using a frequency less than or equal to the first reference frequency FR1 and outputs an image by using a frequency smaller than the second reference frequency FR2, functions described with reference to FIG. 8 are performed.

In one example, when the frequency of the first data enable signal DE1 is less than the second reference frequency FR2, the light emitting display apparatus may stop the sensing operation for the pixels in the second to (n)th frames from which the data voltages are output by the second data enable signal DE2 to the (n)th data enable signal DEn.

Finally, if the computer outputs an image by using a frequency less than the second reference frequency FR2 and outputs an image by using a frequency greater than or equal to the second reference frequency FR2, functions described with reference to FIG. 9 are performed.

In one example, when the frequency of the (n)th data enable signal DEn is increased to be greater than or equal to the second reference frequency FR2, the light emitting display apparatus may perform the sensing operation for the pixels in the (n+1)th frame to the (m)th frame in which the data voltages are outputted by the (n+1)th data enable signal DEn+1 to the (m)th data enable signal DEm.

The sensing operation is not performed while the frequency smaller than the second reference frequency FR2 is used. In this case, even if the frequency is increased, the (n+1)th data enable signal DEn+1 to the (m)th data enable signal DEm need not be delayed.

Accordingly, the light emitting display apparatus according to the present disclosure may express an image in a frequency range larger than a frequency range used in the related art light emitting display apparatus, thereby improving a picture quality.

In addition to the method as described above, the light emitting display apparatus according to the present disclosure may be driven by various methods.

For example, when the variable frequency mode is executed by a user, the light emitting display apparatus may terminate the sensing operation and may set the frequency use range as the maximum frequency to the minimum frequency.

In one example, when the frequency between the maximum frequency and the minimum frequency is received from the computer, the light emitting display apparatus may output the image according to the received frequency.

While the variable frequency mode is performed under the condition that the sensing operation is stopped, the light emitting display apparatus may sense its temperature by using a temperature sensor provided therein. In this case, a lookup table indicating a relationship between temperature and mobility may be stored in a storing portion of the light emitting display apparatus.

The light emitting display apparatus may compensate for the deterioration of driving transistors by using the temperature of the light emitting display apparatus collected by using the temperature sensor and information stored in the lookup table.

In one example, even if the sensing operation is not performed, the light emitting display apparatus may change the size of the data voltages by predicting the deterioration degree of the driving transistors, thereby improving the picture quality of the light emitting display apparatus.

According to an aspect of the present disclosure, a sensing operation already in progress may normally end.

According to an aspect of the present disclosure, a range of frequencies which may be used may be increased.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other embodiments by those skilled in the art. Therefore, content associated with the combination and modification should be construed as being within the scope of the present disclosure.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A light emitting display apparatus comprising:

a control driver configured to (1) based on a frequency of a first data enable signal, among a plurality of data enable signals, being greater than a first reference frequency, delay a remaining plurality of data enable signals, including a second data enable signal to an (n)th data enable signal, by a delay period, wherein n is a natural number greater than or equal to 2, and (2) convert input image data into image data;

a data driver configured to output data voltages by using the image data and the plurality of data enable signals including the first data enable signal to the (n)th data enable signal transmitted from the control driver; and a light emitting display panel provided with pixels and data lines to which the data voltages are supplied, wherein the control driver is configured to determine whether the frequency of the first data enable signal is greater than the first reference frequency by counting a duration of a vertical blank period in which a data pulse is not generated in the first data enable signal.

2. The light emitting display apparatus according to claim 1, wherein the control driver is configured to complete a sensing operation for the pixels processed in a first frame corresponding to the first data enable signal during a delay period of the second data enable signal.

3. The light emitting display apparatus according to claim 1, wherein the control driver is configured to stop a sensing operation for the pixels in a second frame to an (n)th frame in which data voltages are output by the second data enable signal to the (n)th data enable signal.

4. The light emitting display apparatus according to claim 1, wherein the control driver is configured to delay the input image data corresponding to the second data enable signal to the (n)th data enable signal by the delay period when the second data enable signal to the (n)th data enable signal are delayed by the delay period.

5. The light emitting display apparatus according to claim 1, wherein the control driver comprises:

a delay portion configured to delay the second data enable signal to the (n)th data enable signal by the delay period when the frequency of the first data enable signal is greater than the first reference frequency; and a converting portion configured to convert the input image data to the image data and to transmit the image data and the first to the (n)th data enable signals transmitted from the delay portion to the data driver.

6. The light emitting display apparatus according to claim 5, wherein the delay portion comprises:

a counter configured to determine whether the frequency of the first data enable signal is greater than the first reference frequency by counting a vertical blank period of the first data enable signal;

a multiplexer MUX configured to transmit the second data enable signal to the converting portion under the control of the counter when the frequency of the first data enable signal is less than or equal to the first reference frequency; and a buffer configured to (1) delay the second data enable signal transmitted through the MUX by the delay period according to control of the counter when the frequency of the first data enable signal is greater than the first reference frequency, and (2) transmit the delayed second data enable signal to the converting portion.

7. The light emitting display apparatus according to claim 1, wherein the delay period in which the second data enable signal and a third data enable signal are delayed is changed according to a magnitude of the frequency of the first data enable signal.

8. The light emitting display apparatus according to claim 1, wherein the control driver is configured to (1) not delay an (n+1)th data enable signal to an (m)th data enable signal when the frequency of the (n)th data enable signal is reduced to be less than or equal to the first reference frequency, and (2) perform a sensing operation for the pixels, wherein m is a natural number greater than n+1.

9. The light emitting display apparatus according to claim 1, wherein the control driver is configured to (1) not delay an (n+k+1)th data enable signal to an (m)th data enable signal when frequencies of the (n)th data enable signal to an (n+k)th data enable signal are reduced to be less than or equal to the first reference frequency, and (2) perform a sensing operation for the pixels, wherein m is a natural number greater than n+k+1, and k is a preset natural number.

10. The light emitting display apparatus according to claim 1, wherein the control driver is configured to stop a sensing operation for the pixels in a second frame to an (n)th frame in which data voltages are output by the second data enable signal to the (n)th data enable signal.

11. The light emitting display apparatus according to claim 10, wherein the control driver is configured to perform the sensing operation for the pixels in an (n+1)th frame to an (m)th frame in which data voltages are output by an (n+1)th data enable signal to the (m)th data enable signal when the frequency of the (n)th data enable signal is increased to be greater than the second reference frequency, wherein m is a natural number greater than n+1.

12. The light emitting display apparatus according to claim 11, wherein the (n+1)th data enable signal to the (m)th data enable signal are not delayed.

13. A light emitting display apparatus comprising:

a control driver configured to:

monitor a frequency of a first data enable signal among a plurality of data enable signals; and based on a comparison of the frequency of the first data enable signal with a threshold, control a timing of remaining data enable signals among the plurality of data enable signals; and convert input image data into image data;

a data driver configured to generate output data voltages based on the plurality of data enable signals and the image data; and a light emitting display panel provided with pixels and data lines to which the data voltages are supplied for displaying an image represented by the image data, wherein the control driver is configured to compare the frequency of the first data enable signal with the threshold by counting a duration of a vertical blank period in which a data pulse is not generated in the first data enable signal.

14. The light emitting display apparatus of claim 13, wherein the control driver is configured to control the timing of the remaining data enable signals by:

determining that the frequency of the first data enable signal is greater than the threshold; and delaying the remaining data enable signals by a period when the frequency is greater than the threshold.

15. The light emitting display apparatus of claim 14, wherein the control driver is configured to determine the frequency of the first data enable signal to be greater than the threshold by counting a vertical blank period of the first data enable signal.

16. The light emitting display apparatus of claim 14, wherein the period is determined based on a magnitude of the frequency of the first data enable signal.

17. The light emitting display apparatus of claim 14, wherein the control driver comprises a buffer and a multiplexer.

18. The light emitting display apparatus of claim 17, wherein the multiplexer is configured to activate the buffer for delaying the remaining data enable signals by the period.

19. The light emitting display apparatus of claim 13, wherein the control driver is configured to control the timing of the remaining data enable signals by:

determining that the frequency of the first data enable signal is equal to or less than the threshold; and not delaying the remaining data enable signals when the frequency is equal to or less than the threshold.

* * * * *